(12) United States Patent
Hu

(10) Patent No.: US 9,888,158 B2
(45) Date of Patent: Feb. 6, 2018

(54) NIGHT VISION DEVICE

(71) Applicant: BOLYMEDIA HOLDINGS CO. LTD., Santa Clara, CA (US)

(72) Inventor: Xiaoping Hu, Shenzhen (CN)

(73) Assignee: Bolymedia Holdings Co., Ltd., Santa Clara, CA (US)

( * ) Notice: Subject to any disclaimer, the term of this patent is extended or adjusted under 35 U.S.C. 154(b) by 0 days.

(21) Appl. No.: 15/327,366

(22) PCT Filed: Jul. 24, 2014

(86) PCT No.: PCT/CN2014/082945
§ 371 (c)(1),
(2) Date: Jan. 18, 2017

(87) PCT Pub. No.: WO2016/011646
PCT Pub. Date: Jan. 28, 2016

(65) Prior Publication Data
US 2017/0155812 A1    Jun. 1, 2017

(51) Int. Cl.
*H04N 5/222* (2006.01)
*H04N 5/225* (2006.01)
(Continued)

(52) U.S. Cl.
CPC ............ *H04N 5/2256* (2013.01); *G02B 7/282* (2013.01); *G02B 13/14* (2013.01); *G02B 13/16* (2013.01); *G02B 15/12* (2013.01); *G02B 15/14* (2013.01); *H04N 5/23293* (2013.01); *H04N 5/23296* (2013.01); *H04N 5/33* (2013.01)

(58) Field of Classification Search
CPC ........... G02B 13/14; G02B 15/12; H04N 5/33
See application file for complete search history.

(56) References Cited

FOREIGN PATENT DOCUMENTS

| CN | 1873455 A | 12/2006 |
|----|-----------|---------|
| CN | 202443233 U | 9/2012 |

(Continued)

OTHER PUBLICATIONS

International Search Report for PCT/CN2014/082945 dated Apr. 29, 2015 and its English translation provided by WIPO.

(Continued)

*Primary Examiner* — Gary C Vieaux
(74) *Attorney, Agent, or Firm* — Ladas & Parry, LLP

(57) ABSTRACT

A night vision device, comprising a first light-sensitive chip, a first lens group (101), a first display screen, an image processing system and a control system for adjusting an imaging range of the first light-sensitive chip by adjusting times of optical zooming of the first lens group and/or digital zooming of the image processing system. The night vision device further comprises an auxiliary illumination module (103), which comprises an auxiliary light source and a light guiding cavity; the auxiliary light source at least can emit infrared light; a light ray emitted by the auxiliary light source is emitted via the light guiding cavity; the light guiding cavity has a movable adjustment component for adjusting an irradiation range of the emitted light ray in a manual manner or by means of automatic control by the control system; and the irradiation range is adapted to the imaging range of the first light-sensitive chip. The night vision device according to the present invention can improve a night visual range and imaging quality without changing the level of hardware.

13 Claims, 3 Drawing Sheets

(51) Int. Cl.
       *H04N 5/33*        (2006.01)
       *H04N 5/232*       (2006.01)
       *G02B 13/14*       (2006.01)
       *G02B 13/16*       (2006.01)
       *G02B 15/14*       (2006.01)
       *G02B 7/28*        (2006.01)
       *G02B 15/12*       (2006.01)

(56) References Cited

FOREIGN PATENT DOCUMENTS

| | | |
|---|---|---|
| CN | 202720431 U | 2/2013 |
| CN | 202856906 U | 4/2013 |
| CN | 103354611 A | 10/2013 |
| CN | 203554559 U | 4/2014 |
| CN | 203708331 U | 7/2014 |
| JP | 03-38609 | 2/1991 |
| JP | 11-146258 | 5/1999 |
| JP | 2000352656 A | 12/2000 |
| JP | 2006017923 A | 1/2006 |
| JP | 2010161736 A | 7/2010 |

OTHER PUBLICATIONS

Written Opinion of the International Search Authority for PCT/CN2014/082945 dated Apr. 29, 2015 (English translation provided by WIPO).
From CN1873455A, Search Report, and its English translation from Bing Translator.

NIGHT VISION DEVICE

CROSS-REFERENCE TO RELATED APPLICATION

This application is the U.S. National Stage of International Patent Application No. PCT/CN2014/082945 filed on Jul. 24, 2014, the disclosure of which is hereby incorporated by reference in its entirety.

TECHNICAL FIELD

The present disclosure relates to optical technology, specifically to a night vision device.

BACKGROUND

Night vision devices are widely used in adventure, field exploration and military, etc.

In early night version devices, there is no auxiliary light source, and thermal imaging is used, by which thermal imaging images are obtained through sensing the wavelength of blackbody radiation, and converted into images visible to human eye through a display. For the devices of this period, complex cooling means are needed, the size is large, and the night vision distance is short.

With advances in light-sensitive chip and light-emitting diode (LED) illumination, night vision device using infrared LED as an auxiliary light source has been proposed, in which telescope lens is generally used, images are obtained using light-sensitive chip and displayed on a liquid crystal display (LCD), and a fixed light-output structure is generally used by the auxiliary light source. In the case that improving the image quality of the night vision device is desired, the resolution of the light-sensitive chip needs to be increased, which will lead to reduction in sensitivity and, thereby, shortening in night vision distance. In the case that zooming is used to increase the night vision distance, the auxiliary light source needs to have a corresponding illumination distance, which will lead to increase in number of the lights in order to increase illumination energy. However, when the focal length is shortened, energy waste will occur.

SUMMARY

A night vision device according to the present disclosure may include a first light-sensitive chip which may be at least sense infrared light, a first lens group which may be used to image onto the first light-sensitive chip, a first display which may be used to display the images collected by the first light-sensitive chip, and a control system which may be used to adjust the imaging range of the first light-sensitive chip by optical zoom and/or digital zoom. The night vision device may further include an auxiliary illumination unit which may include an auxiliary light source and a light guiding cavity. The auxiliary light source may be at least able to emit infrared light. The light emitted by the auxiliary light source may be emitted through the light guiding cavity. The light guiding cavity may have a movable adjustment component which may be used to adjust the irradiation range of the emitted light manually or automatically by the control system. The irradiation range may be adapted to the imaging range of the first light-sensitive chip.

In the night vision device according to the present disclosure, since the irradiation range of the auxiliary light source is adapted to the imaging range of the light-sensitive chip by adjusting the movable adjustment component manually or automatically, the energy of the auxiliary light source can be used on the scene to be imaged fully and effectively. Night vision distance and image quality can be increased without changing the hardware level (the resolution of the light-sensitive chip and the illumination capability of the auxiliary light source).

The specific examples according to the present disclosure will be described in details below with reference to the drawings.

DETAILED DESCRIPTION

Embodiment 1

Figure 1:
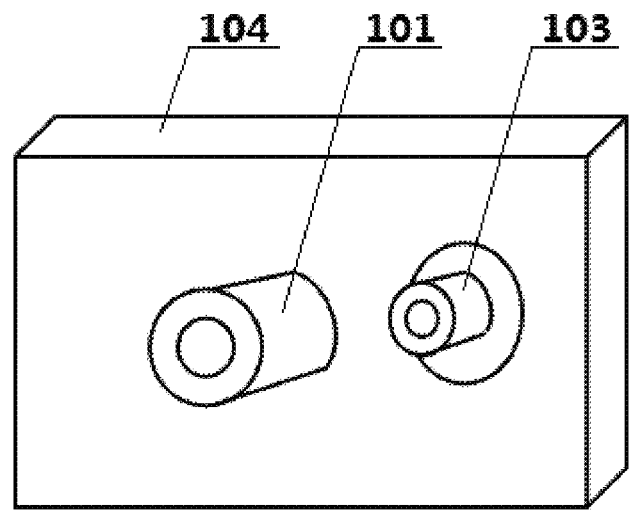
FIG. 1 schematically shows the front side of the night vision device in embodiment 1.
Figure 2:
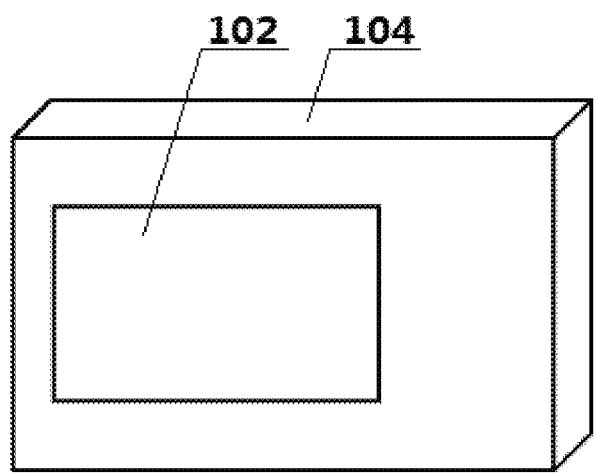
FIG. 2 schematically shows the back side of the night vision device in embodiment 1.

FIG. 1 and FIG. 2 schematically show an embodiment of a night vision device according to the present disclosure, which may include a first light-sensitive chip, a first lens group 101, a first display 102, an image processing system, a control system and an auxiliary illumination unit 103. The first light-sensitive chip, the image processing system and the control system may be housed in a body 104 of the night vision device.

The first light-sensitive chip can at least sense infrared light. For example, an ordinary high-resolution light-sensitive chip, i.e. a light-sensitive chip used in an ordinary digital camera, may be used. Light in a wide spectral range can be sensed by this kind of light-sensitive chip, including infrared light and visible light. In addition, the high resolution thereof may also enable the application of the digital zoom.

The first lens group may be used for imaging on the first light-sensitive chip, and may be a fixed focus lens group with a fixed magnification or a zoom lens group with adjustable magnification. Preferably, the first lens group may further have the capability of auto focus, and the control system may automatically adjust the focal length between the first lens group and the first light-sensitive chip based on the distance of the object to be observed and the zoom factor of the first lens group.

The first display may be used to display the images obtained by the first light-sensitive chip. The light-sensitive chip may sense infrared light invisible or difficultly visible to human eye and generate image data which may be displayed on the display in the form of black-and-white images, thereby achieving night vision. In the present disclosure, the first display may be two-dimensional liquid crystal display. In the case that it is only used to achieve night vision, black-and-white display may be used.

The image processing system may be used to process the image data collected by the first light-sensitive chip. In the present disclosure, at least one of the image processing system and the first lens group may have the capability of zoom. The first lens group may have the capability of optical zoom, and the image processing system may have the capability of digital zoom. Of course, as well known, they may also have both of the two kinds of zoom capability.

The control system may include a logic processing device which may achieve control functions and peripheral circuits thereof. The control system may control various components of the night vision device by executing instructions. A person skilled in the art will well know how to configure the software and hardware to achieve general control functions desired by the night vision device, such as controlling the image collection of the light-sensitive chip and the displaying of the display, controlling a power supply unit to supply power to desired component, etc. The component units forming the control system may be centrally arranged at a same physical location, or discretely arranged at different locations in the body. All control functions may be achieved by a single processor, or be collaboratively achieved by a plurality of processors.

In the present embodiment, the control system may at least have a control capability of adjusting optical zoom factor or digital zoom factor in order to adjust the imaging range of the light-sensitive chip. Of course, when the optical zoom is used, it is desired that the first lens group has corresponding capability, and when the digital zoom is used, it is desired that the image processing system has corresponding capability. The control system may also control the optical zoom and the digital zoom at the same time in order to adjust the imaging range of the light-sensitive chip in greater range. The imaging range herein may be the range of the scene corresponding to the effective images displayed on the display, size of which may be represented by field of view angle. As well known, the field of view angle of the light-sensitive chip may be negative correlation with the focal length (including the optical focal length and the digital focal length). The longer the focal length, the smaller the field of view angle.

The auxiliary illumination unit may include an auxiliary light source which can emit infrared light and a light guiding cavity which can guide and emit the light ray emitted by the auxiliary light source. The light guiding cavity according to the present disclosure may include a movable adjustment component which may be used to adjust irradiation range of the emitted light manually or automatically by the control system. The irradiation range may be adapted to the imaging range of the light-sensitive chip. According to the analysis above, in different zoom factors, the light-sensitive chip may have different imaging ranges (field of view angle). Therefore, by adjusting the irradiation range of the auxiliary light source such that it is adapted to the imaging range, the energy of the auxiliary light source may be utilized more effectively. The irradiation range being adapted to the imaging range herein may refer to the irradiation range being the same or nearly the same with the imaging range. For example, in the case that the zoom factor is large, a distant object with small field of view angle is observed, and the emitted light may be properly focused such that the distant object can be illuminated better. In the cast that the zoom factor is small, a close object with large field of view angle is observed, and the emitted light may be properly diverged in order to cover the whole observation range. A person skilled in the art will understand that various movable adjustment components may be designed based on existing knowledge about optical path adjustment in order to change the optical structure of the light guiding cavity to adjust the irradiation range of the output light ray. The adjustment to the structure of the light guiding cavity may be achieved by adjusting the movable adjustment component manually, or may also be achieved by the control system by synchronously automatically adjusting the movable adjustment component based on current focal length when it performs the zoom or auto focus control.

The auxiliary light source may be, for example, infrared LED. The infrared light emitted may include visible and invisible infrared light. The visible infrared light herein may generally refer to the infrared light whose wavelength is in the range of 800 nm to 920 nm. The invisible infrared light herein may generally refer to the infrared light whose wavelength is larger than 920 nm. In some embodiments, the auxiliary light source may also generate visible light.

Figure 3:
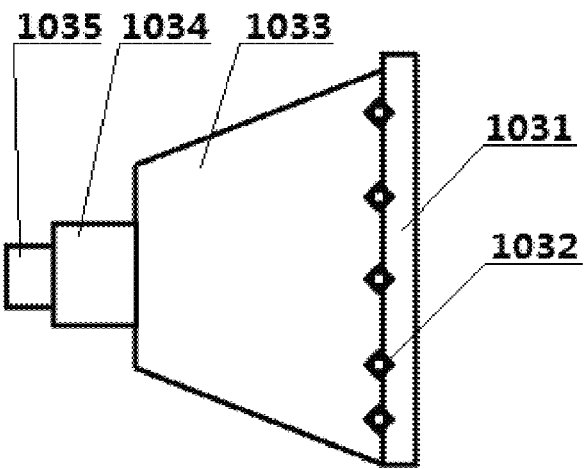
FIG. 3 schematically shows an auxiliary illumination unit in embodiment 1.

For most practical applications, in the case that the lateral (i.e. the direction perpendicular to the optical axis) distance between the auxiliary illumination unit and the lens is far less than the distance between the auxiliary illumination unit and the object observed, it can be approximately considered that the optical axis of the light emitted by the auxiliary illumination unit is consistent with that of the light-sensitive chip. Therefore, in an embodiment, the matching between the irradiation range of the light and the imaging range may be achieved by adjusting the divergence angle of the light such that the divergence angle matches the field of view angle of the light-sensitive chip in different focal lengths. FIG. 3 shows an auxiliary illumination unit according to the present disclosure described in the present embodiment, which may include a LED light board 1031 used as an auxiliary light source and a light guiding cavity. The LED light board may be provided with a plurality of infrared LED 1032. An inner wall of the light guiding cavity may have reflectivity which may be achieved by forming the inner wall using reflective materials or coating a reflective film on the inner wall. The light guiding cavity may include a light collection part 1033 and a guiding pipe 1034 which are communicated with each other. The LED light board may be enclosed in the light collection part and emit light via the guiding pipe communicated with the light collection part. The guiding pipe may be used as the movable adjustment component, and may be telescopic. The telescoping part 1035 may be adjusted manually. For example, the telescoping part may be fitted with a fixed part in a threaded coupling, the length of which may be adjusted by manual rotation. As another example, the telescoping part may be sleeved at inside or outside of the fixed part in a tight fit, the length of which may be adjusted by pulling out or pushing in by hand. The telescoping part of the guiding pipe may also be automatically controlled by the control system. Preferably, a polyhedral ultrasonic motor may be used to drive the guiding pipe to telescope. The polyhedral ultrasonic motor used may adopt the principles and structures described in a Chinese patent application with a publication number of CN1873455A and titled as "an integrated optical equipment focus/zoom system". Using the ultrasonic motor to drive the guiding pipe may have the advantages of high precision, low power consumption and no noise, etc. The fixed part of the guiding pipe may be used as the stator of the ultrasonic motor. The telescoping part of the guiding pipe may be used as the mover of the ultrasonic motor or may be driven by the mover. The telescoping part of the guiding pipe may be telescoped by spiral motion or by moving in the axial direction while fixed in the radial direction. The control system may control the guiding pipe to elongate or retract by controlling the rotation direction of the ultrasonic motor. When the guiding pipe is elongated, the divergence angle of the light emitted may be reduced and used to match small field of view angle. When the guiding pipe is retracted, the divergence angle of the light emitted may be increased and used to match large field of view angle. Preferably, the auto focus of the first lens group may also be driven by a polyhedral ultrasonic motor.

Figure 4:
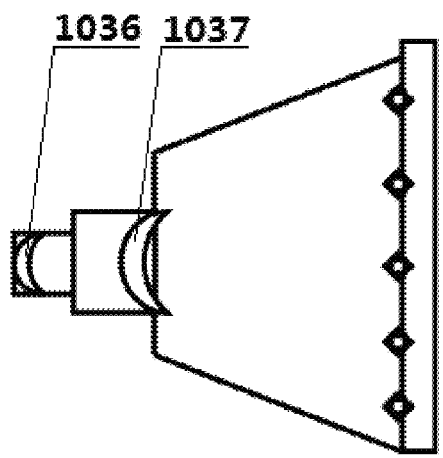
FIG. 4 schematically shows another auxiliary illumination unit in embodiment 1.

FIG. 4 shows another auxiliary illumination unit according to the present disclosure described in the present embodiment. Compared with the structures shown in FIG. 3, the difference is in that two condensing lens groups may further be provided. The first condensing lens group 1036 may be disposed in the telescoping part of the guiding pipe, and the second condensing lens group 1037 may be fixedly disposed on the optical path before the first condensing lens group. For example, the second condensing lens group may be fixedly disposed at the location where the light collection part is connected with the guiding pipe. Similar to the structures in FIG. 3, the telescoping of the guiding pipe may be achieved manually or automatically. With the telescoping of the guiding pipe, relative position change between the two lens groups will occur, thereby changing the degree of convergence of the light exited. Compared with the structures shown in FIG. 3, since two lens groups are further provided, the capability of adjusting the exit angle of the light may be increased and high-performance auxiliary illumination may be achieved.

In the present embodiment, the first display may be a black-and-white LCD. In other embodiments, the first display may also be a color LCD and the first light-sensitive chip may further sense visible light. In this case, the night vision device may further include movable infrared filter. The movable infrared filter may be disposed between the first light-sensitive chip and the first lens group and able to be moved in a direction perpendicular to the optical axis of the first lens group such that, in the case of suitable light, the night vision device may also be used to obtain color image in order to extend the applicable situation. For example, during the day or when the light intensity is sufficient (which may be determined by the control system using a metering component), the infrared filter may be controlled to be arranged between the light-sensitive chip and the lens group. In this case, the night vision device is in color mode and color images may be obtained and displayed. At night or when the light intensity is not sufficient, the infrared filter may be controlled to be moved away from the optical path of the first lens group. In this case, the night vision device is in infrared mode and black-and-white images may be obtained and displayed.

In some embodiment, the night vision device may further include a storage unit which may be used to store the images collected by the light-sensitive chip. For example, pluggable flash memory, hard disk and magnetic memory, etc. may be used.

In some embodiments, the night vision device may further include a wireless communication unit in order to perform data transmission with remote entity by various suitable wireless communications. For example, the images collected by the light-sensitive chip or information related to the image may be transmitted. The wireless communications may include, but not limited to, 2G/GPRS/3G/4G, WiFi, Bluetooth, 2.4G, WiMax or other standard or dedicated communications.

Embodiment 2

Figure 5:
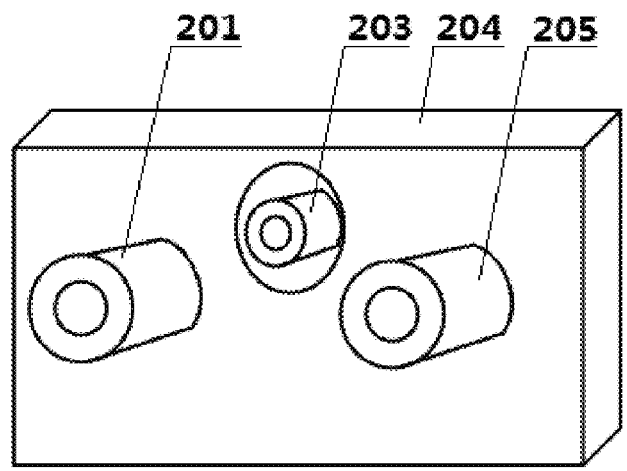
FIG. 5 schematically shows the front side of the night vision device in embodiment 2.
Figure 6:
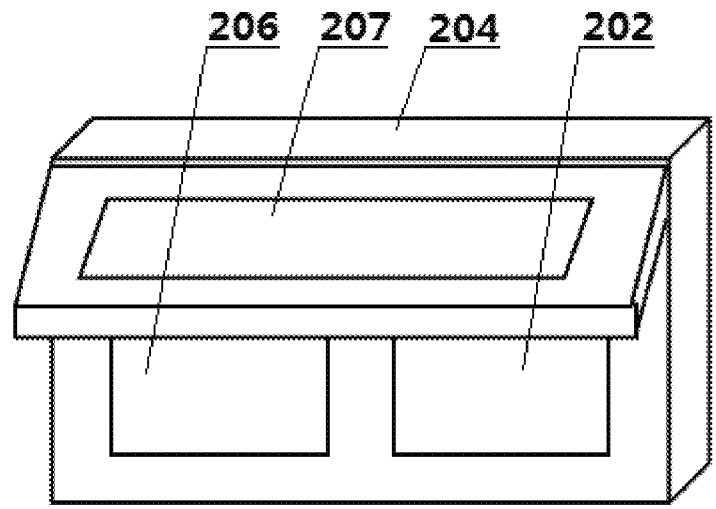
FIG. 6 schematically shows the back side of the night vision device in embodiment 2.

FIG. 5 and FIG. 6 show another embodiment of the night vision device according to the present disclosure. Compared with embodiment 1, the difference is in that two sets of lens group and light-sensitive chip are provided. Embodiment 1 may be considered as a monocular night vision device, while the present embodiment may provide a binocular night vision device, which may include a first light-sensitive chip, a second light-sensitive chip, a first lens group 201, a second lens group 205, a first display 202, a second display 206, a third display 207, an image processing system, a control system and an auxiliary illumination unit 203. The first light-sensitive chip, the second light-sensitive chip, the image processing system and the control system may be housed in a body 204 of the night vision device.

In the present embodiment, the first light-sensitive chip, the first lens group, the first display, the image processing system and the auxiliary illumination unit may be similar to those in embodiment 1, and the second light-sensitive chip, the second lens group and the second display may be similar to the firs light-sensitive chip, the first lens group and the first display. The third display may be a stereo display and used to synthesize the images collected by the first light-sensitive chip and the second light-sensitive chip into a stereo image and display the stereo image. In the present embodiment, the control system may further, besides performing the functions described in embodiment 1, synchronously adjust the imaging ranges of the first light-sensitive chip and the second light-sensitive chip and perform the calculation and control functions related to 3D imaging. Since both 2D and 3D displays are provided, the night vision device of the present embodiment may have two different use modes, i.e. headset mode and handheld mode. In the headset mode, the control system may open the first display and the second display and close the third display. In this case, the night vision device may be worn on the head of the user (the night vision device may have a shape similar to a hood). The user may lift up the third display and the eyes may respectively watch the first display and the second display. A stereo image may be generated by the vision of the eyes. In field or underwater activities, this use mode may be used. In the handheld mode, the user may put down the third display, and the control system may close the first display and the second display and open the third display to display the 3D images directly.

In other embodiments, it may also be possible that only two 2D displays are provided and the stereo display is omitted. The two 2D displays may respectively be used to display the images collected by the first light-sensitive chip and the second light-sensitive chip. In this case, the night vision device may also be used in different ways, i.e. headset use and handheld use. In other embodiments, it may also be possible that only a stereo display is provided, which is used to synthesize the images collected by the first light-sensitive chip and the second light-sensitive chip into a stereo image and display the stereo image.

In order to expand the use of the night vision device, preferably, the control system may further have a space calculation function, i.e. calculating a spatial location of a image point with respect to the night vision device based on the relation between the images collected by the first light-sensitive chip and the second light-sensitive chip. Further preferably, the night vision device may further include a satellite positioning unit, such as a GPS unit, which may be used to obtain the location information of the night vision device itself, and the control system may further be used to calculate the location information of the image point based on the location information of the night vision device itself and the spatial location of the image point with respect to the night vision device. By combining three-dimensional ranging and satellite positioning, remotely measuring the position coordinates of observed object using the night vision device may be achieved, which has a broad application value. For example, it may be used in aerial photography, map marking, field rescue and airborne, etc.

In the present embodiment, the night vision device may similarly be provided with storage unit and communication unit and other extensions, which will not be described again.

Embodiment 3

Figure 7:
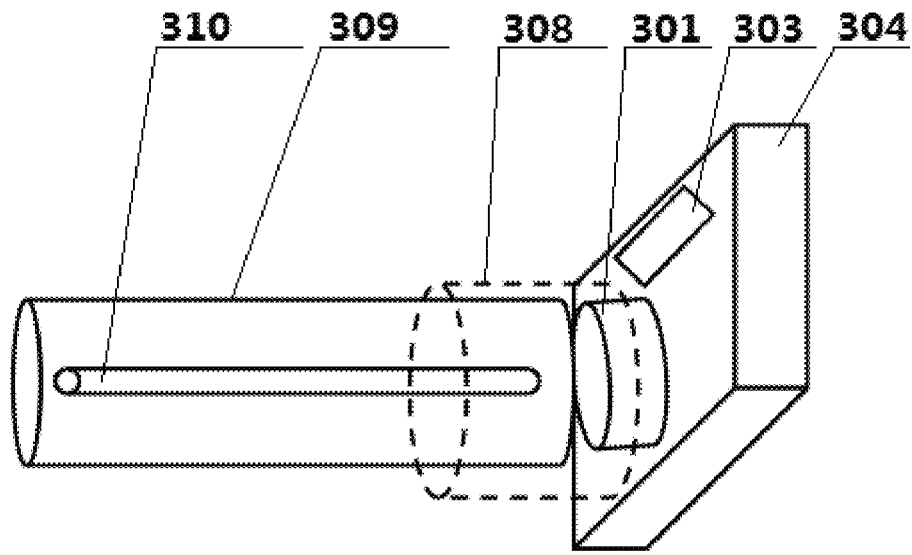
FIG. 7 schematically shows the night vision device in embodiment 3.

FIG. 7 shows another embodiment of the night vision device according to the present disclosure. Compared with embodiment 1, the main difference is in that an external telescope lens is provided. In the present embodiment, the night vision device may include a first light-sensitive chip, a first lens group 301, a first display (not shown), an image processing system, a control system, an auxiliary illumination unit 303, a connection sleeve 308 and a telescope lens 309. The first light-sensitive chip, the image processing system and the control system may be housed in a body 304 of the night vision device.

In the present embodiment, the first light-sensitive chip, the first lens group, the first display, the image processing system, the control system and the auxiliary illumination unit may be similar to those described in embodiment 1. The connection sleeve may be formed using rubber or plastic, and may be used to connect the telescope lens to the first lens group in order to increase the zoom factor. The end of the connection sleeve sleeved with the telescope lens may be configured to have different sizes in order to connect telescope lenses with different specifications or different purposes to the first lens group, thereby expanding the application of the night vision device. The telescope lens used may be an ordinary telescope or an astronomical telescope or a gun sight telescope. It can be used to facilitate not only the night sighting, but also the daytime sighting. In the present embodiment, the first lens group may preferably have a high-precision auto focus capability in order to satisfy the requirements for focus accuracy after the telescope lens is sleeved. The auto focus driven by the polyhedral ultrasonic motor can satisfy such requirements.

In the present embodiment, the night vision device may preferably further include a laser range finder. A laser emission conduit 310 of the laser range finder may be disposed in the telescope lens. The optical axis of the laser may be parallel to the optical axis of the telescope lens. The laser range finder may be used to measure the distance between the center point of the image and the night vision device. A laser detector of the laser range finder may be disposed in the body of the night vision device. The laser emitted from the laser emission conduit may mark an aiming point and detected by the laser detector after being reflected by the target object. The control system of the night vision device may calculate the distance between the night vision device and the aiming point marked by the laser based on the time difference between the emission and reception of the laser. In some applications, knowing the distance of the target will facilitate the calculation of the trajectory.

It should be understood that the external telescope lens and the laser range finder of the night vision device in the present embodiment may also be used in the night vision device in embodiment 2. Correspondingly, the monocular connection sleeve may be replaced with a binocular connection sleeve (the laser range finder may be only one) in order to extend the zoom factor and viewing distance of the binocular night vision device. In addition, the combination of the binocular night vision device with the laser range finder may facilitate the determination of the location and distance of the observation point.

The principles and embodiments of the present disclosure have been described with reference to specific examples. However, it should be understood that the embodiments above are only used to facilitate the understanding to the present disclosure, but should not be interpreted as limitations thereto. The night vision device according to the present disclosure may be configured with various shapes and purposes. For example, it may be used as an ordinary night vision goggle, a gun sight night vision goggle, a firefighting night vision goggle, a mining night vision goggle or a military night vision goggle, etc. For a person skilled in the art, modifications may be made to the embodiments above based on the concepts of the present disclosure.

I claim:

1. A night vision device, comprising:
a first light-sensitive chip which is at least able to sense infrared light;
a first lens group which is used to image onto the first light-sensitive chip;
a first display which displays an image collected by the first light-sensitive chip;
an image processing system which processes image data collected by the first light-sensitive chip, wherein the image processing system has a digital zoom capability and/or the first lens group has an optical zoom capability; and
a control system which adjusts an imaging range of the first light-sensitive chip by adjusting an optical zoom factor of the first lens group and/or a digital zoom factor of the image processing system;
wherein the night vision device further comprises:
an auxiliary illumination unit which comprises an auxiliary light source and a light guiding cavity, wherein,
an inner wall of the light guiding cavity has reflectivity, the light guiding cavity comprises a light collection part and a guiding pipe which are communicated with each other, the auxiliary light source is enclosed in the light collection part and emits light via the guiding pipe communicated with the light collection part, and the guiding pipe is used as the movable adjustment component and is telescopic,
the auxiliary light source is at least able to emit infrared light, a light emitted by the auxiliary light source is emitted through the light guiding cavity, the light guiding cavity has a movable adjustment component which is used to adjust an irradiation range of emitted light manually or automatically by the control system, and the irradiation range is adapted to the imaging range of the first light-sensitive chip.

2. The night vision device of claim 1, wherein:
the first lens group further has an auto-focus capability, and the control system is further used to automatically adjust a focal length between the first lens group and the first light-sensitive chip based on a distance of an object to be observed and a zoom factor of the first lens group.

3. The night vision device of claim 1, wherein:
a first condensing lens group is further disposed in a telescoping part of the guiding pipe, and a second condensing lens group is disposed on an optical path before the first condensing lens group.

4. The night vision device of claim 1, wherein:
telescoping of the guiding pipe is driven by a polyhedral ultrasonic motor.

5. The night vision device of claim 1, further comprising a movable infrared filter which is disposed between the first light-sensitive chip and the first lens group and able to be moved in a direction perpendicular to an optical axis of the first lens group;
wherein the first light-sensitive chip is further able to sense visible light.

6. The night vision device of claim 1, further comprising:
a second light-sensitive chip which is at least able to sense infrared light; and
a second lens group which is used to image onto the second light-sensitive chip;
wherein, the control system synchronously adjusts imaging ranges of the first light-sensitive chip and the second light-sensitive chip; and
the first display is a stereo display which is used to synthesize images collected by the first light-sensitive chip and the second light-sensitive chip into a stereo image and display the stereo image.

7. The night vision device of claim 1, further comprising:
a second light-sensitive chip which is at least able to sense infrared light; and
a second lens group which is used to image onto the second light-sensitive chip;
wherein, the control system synchronously adjusts imaging ranges of the first light-sensitive chip and the second light-sensitive chip;
the first display is a two-dimensional display, the night vision device further comprises a second display, and the second display is a two-dimensional display which is used to display an image collected by the second light-sensitive chip.

8. The night vision device of claim 7, wherein:
the night vision device further comprises a third display, wherein the third display is a stereo display which is used to synthesize images collected by the first light-sensitive chip and the second light-sensitive chip into a stereo image and display the stereo image; and
the night vision device has a headset mode and a handheld mode, wherein, in the headset mode, the control system opens the first display and the second display and closes the third display, and, in the handheld mode, the control system closes the first display and the second display and opens the third display.

9. The night vision device of claim 6, wherein:
the control system further calculates a spatial location of an image point with respect to the night vision device based on relation between images collected by the first light-sensitive chip and the second light-sensitive chip.

10. The night vision device of claim 9, further comprising a satellite positioning unit which is used to obtain location information of the night vision device itself;
wherein the control system further calculates location information of an image point based on the location information of the night vision device itself and a spatial location of the image point with respect to the night vision device.

11. The night vision device of claim 1, further comprising a connection sleeve and a telescope lens, wherein the connection sleeve connects the telescope lens to lens group to increase zoom factor.

12. The night vision device of claim 11, further comprising a laser range finder, wherein a laser emission conduit of the laser range finder is disposed in the telescope lens, an optical axis of laser is parallel to an optical axis of the telescope lens, and the laser range finder is used to measure a distance between a center point of an image and the night vision device.

13. The night vision device of claim 7, wherein:
the control system further calculates a spatial location of an image point with respect to the night vision device based on relation between images collected by the first light-sensitive chip and the second light-sensitive chip.

* * * * *